United States Patent
Campbell

Patent Number: 6,159,118
Date of Patent: Dec. 12, 2000

[54] HORIZONTALLY DISPOSED BICYCLE DERAILLEUR

[76] Inventor: Robert X. Campbell, P.O. Box 446, Rochester, N.H. 03866

[21] Appl. No.: 09/273,481

[22] Filed: Mar. 22, 1999

Related U.S. Application Data

[63] Continuation-in-part of application No. 09/033,318, Mar. 2, 1998.

[51] Int. Cl.[7] .............................. F16H 59/00; B62M 1/02
[52] U.S. Cl. ............................................... 474/78; 280/261
[58] Field of Search .............................. 280/261; 474/69, 474/70, 78, 79, 80, 82, 119, 122

[56] References Cited

U.S. PATENT DOCUMENTS

| | | | |
|---|---|---|---|
| 4,023,424 | 5/1977 | Ryan et al. | 74/217 B |
| 4,384,864 | 5/1983 | Bonnard | 474/80 |
| 4,416,646 | 11/1983 | Bergles | 474/80 |
| 4,439,171 | 3/1984 | Bergles | 474/80 |
| 4,758,205 | 7/1988 | Durham | 474/80 |
| 5,213,549 | 5/1993 | Blanchard | 474/81 |
| 5,358,451 | 10/1994 | Lacombe et al. | 474/80 |

Primary Examiner—David A. Bucci
Assistant Examiner—Matthew A. Kaness
Attorney, Agent, or Firm—Hamilton, Brook, Smith & Reynolds, P.C.

[57] ABSTRACT

A guide pulley mounting mechanism for use with a bicycle derailleur. A rear take-up pulley is mounted to a plunger rod that travels within a plunger frame in a more or less horizontal arrangement with respect to the bicycle frame. A bias spring mechanism urges the rear take-up pulley in an outboard direction such that tension is maintained on the chain as different main gear sprockets are selected.

6 Claims, 6 Drawing Sheets

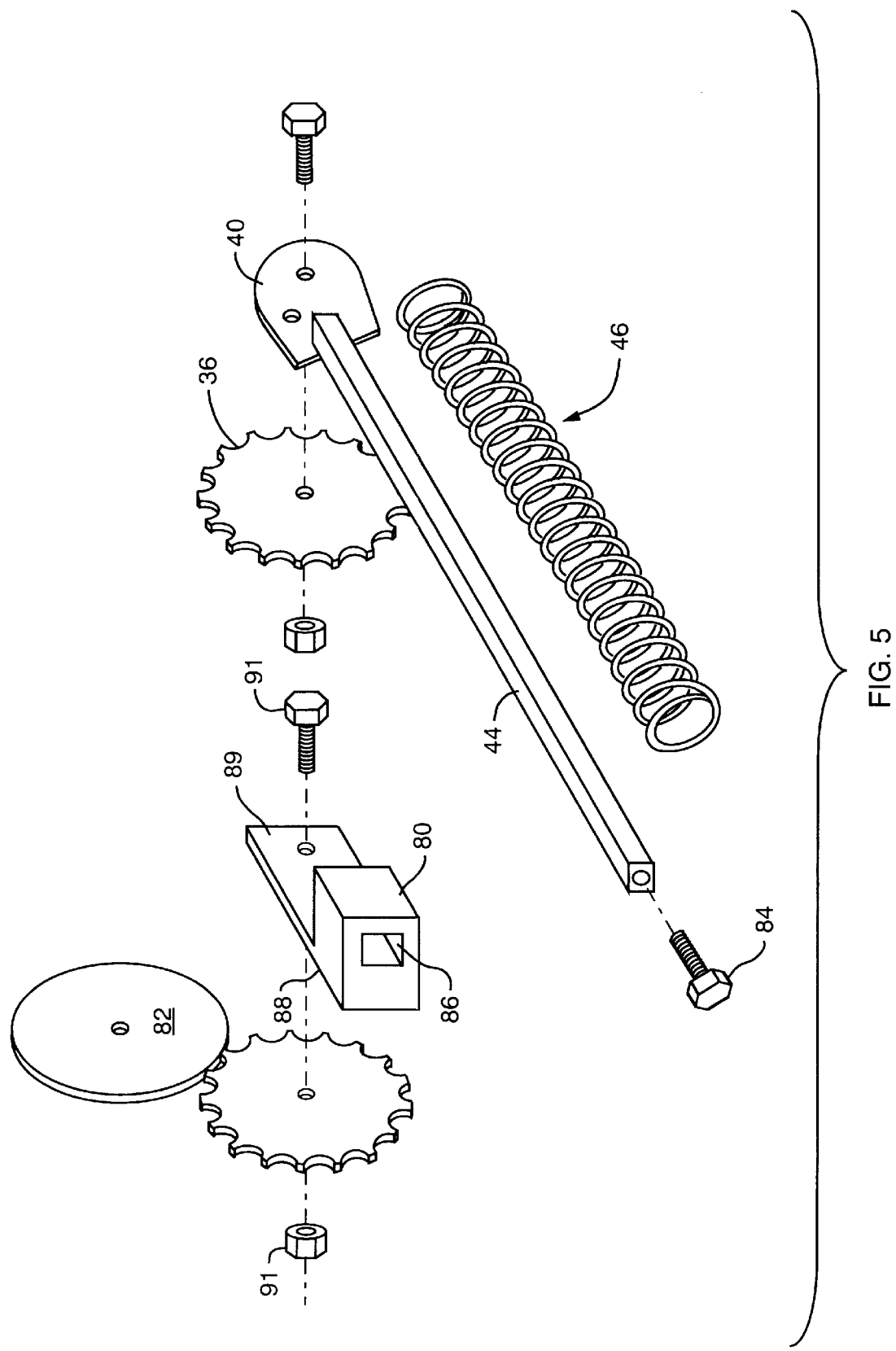

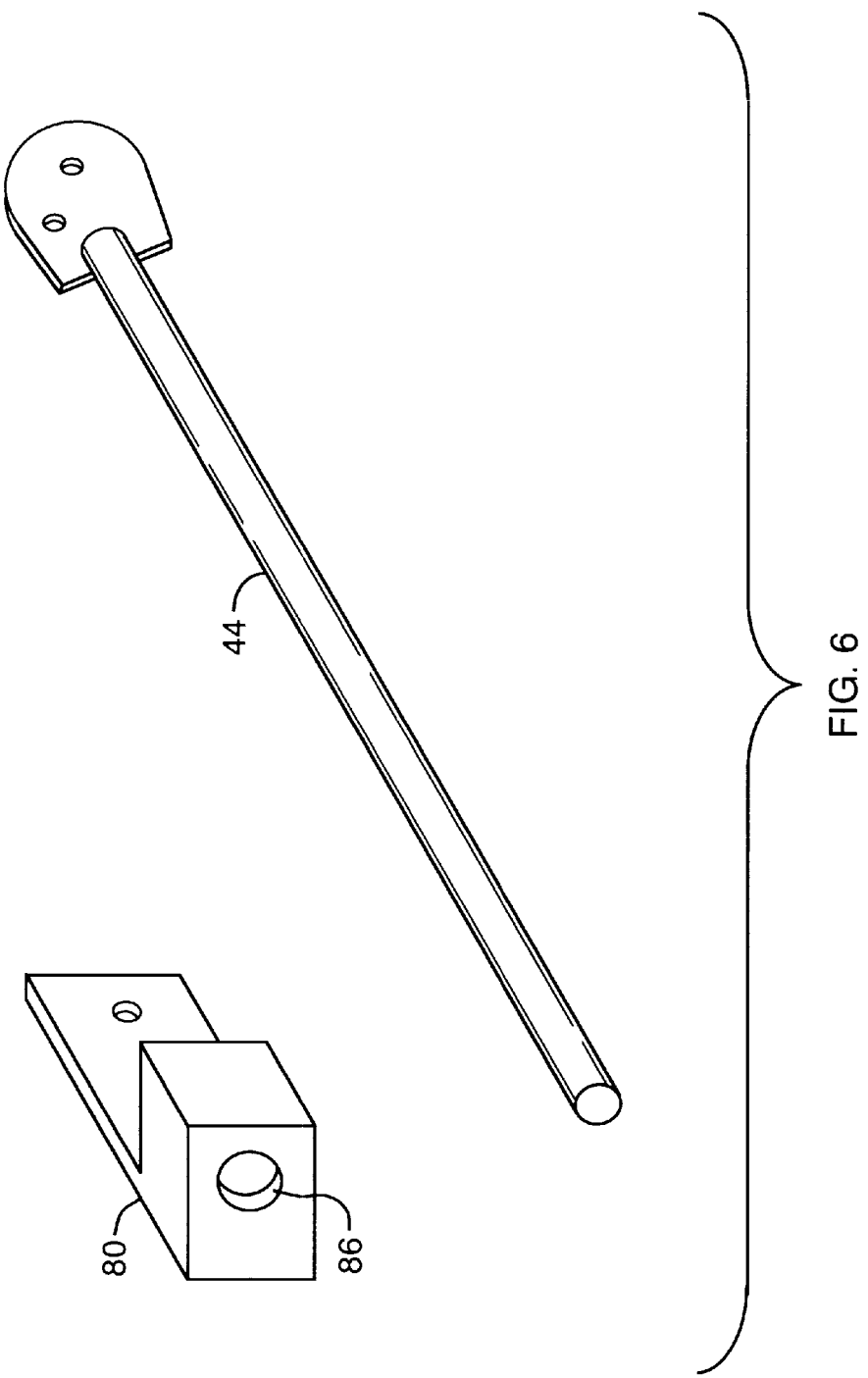

HORIZONTALLY DISPOSED BICYCLE DERAILLEUR

CROSS-REFERENCE TO RELATED APPLICATION

This application is a continuation-in-part of co-pending U.S. patent application Ser. No. 09/033,318 filed Mar. 2, 1998 entitled "Horizontally Disposed Bicycle Derailleur," the entire teachings of which are incorporated herein by reference.

BACKGROUND OF THE INVENTION

Variable speed gearing for bicycles and the like, generally known as derailleurs, have been known for a number of years. Such variable speed gear systems include two or more main sprockets of different diameters typically fixed to the rear wheel hub. A derailleur arm supports a guide sprocket or pulley for transferring the driving chain from one of the main sprockets to another main sprocket to accomplish a gear change. The derailleur mechanism guides the chain as it is moved from one rear sprocket to another, keeping tension on the chain to prevent a derailment, and also serves to take up and play out the chain as required to accommodate the different main sprocket diameters.

Some have proposed alternative arrangements of derailleur mechanisms to assist with accommodating large amounts of chain, minimizing chain misalignment, providing uniform chain tension or increasing ground clearance. For example, U.S. Pat. No. 4,758,205 issued to Durham describes a pantograph-type guide pulley mechanism in which a floating take-up pulley is linked to a resilient fiberglass rod which is in turn secured to the bicycle frame.

However, such arrangements are not entirely satisfactory. The floating take-up pulley and resilient rod extend well beyond the center of the wheel, even well beyond the outermost main sprocket to connect to the bicycle frame. They thus typically require an intermediate support which extends far outward from the area which bicycle enthusiasts normally consider to be an area free from danger of entanglement with clothing, legs and objects being carried by the bicyclist such as rear mounted bicycle carriers, child seats, and the like. This also causes unwanted vibrations and lateral movement of the sprockets which in turn results in chain misalignment.

SUMMARY OF THE INVENTION

What is needed is a bicycle derailleur mechanism which provides increased ground clearance and lateral support without the need to attach supporting members and other devices that extend beyond the central portion of the wheel hub.

Such a device should make use of existing derailleur arms and therefore would not require redesign or re-engineering of the physical gear mechanisms. Ideally, it should also be possible to retrofit such a device to existing bicycles with a minimum of mechanical skill.

The present invention is a bicycle derailleur in which a rear take-up pulley is supported separately from the derailleur arm mechanism. The rear take-up pulley is urged in an outboard direction to take up slack in the chain as the gear cables are changed.

The outward force may be placed on the rear take-up pulley by a plunger frame which in turn supports a spring activated plunger rod arrangement whereby tension is placed on the chain as the rear take-up pulley is urged outward.

Other arrangements such as a rod and spring biased slider block may be used to urge the take-up pulley outward.

As a result, the take-up pulley is now arranged to move horizontally forward and rearward as slack in the chain needs to be played out or taken up, rather than in a more or less up or down direction as with prior art arrangements.

There are several advantages to this invention.

In particular, a bicycle derailleur according to the invention provides improved ground clearance over prior art techniques in which the derailleur arm pushes guide pulleys in a generally downward direction to take up slack in the chain. This is of great advantage to recreational mountain bikers who encounter rough terrain.

In addition, no outwardly extending stays, support frames, or other devices that extend beyond the central area of the wheel hub normally associated with the bicycle derailleur need to be provided.

Furthermore, the invention is easily adapted to be used with existing bicycles and bicycle designs by simply unbolting a standard derailleur arrangement and replacing it with the spring-biased plunger and take-up pulley.

BRIEF DESCRIPTION OF THE DRAWINGS

The above and further features of the invention include various novel details of the construction and combination of components. These novel features will be more particularly pointed out in the following claims, and their advantages will also become evident as they are described in detail with reference to the accompanying drawings, in which:

FIG. 5 is a more detailed view of the FIG. 4 embodiment; and

FIG. 6 shows an alternative cross sectional shape for the rod and slider block arrangement.

DETAILED DESCRIPTION OF A PREFERRED EMBODIMENT

Figure 1:
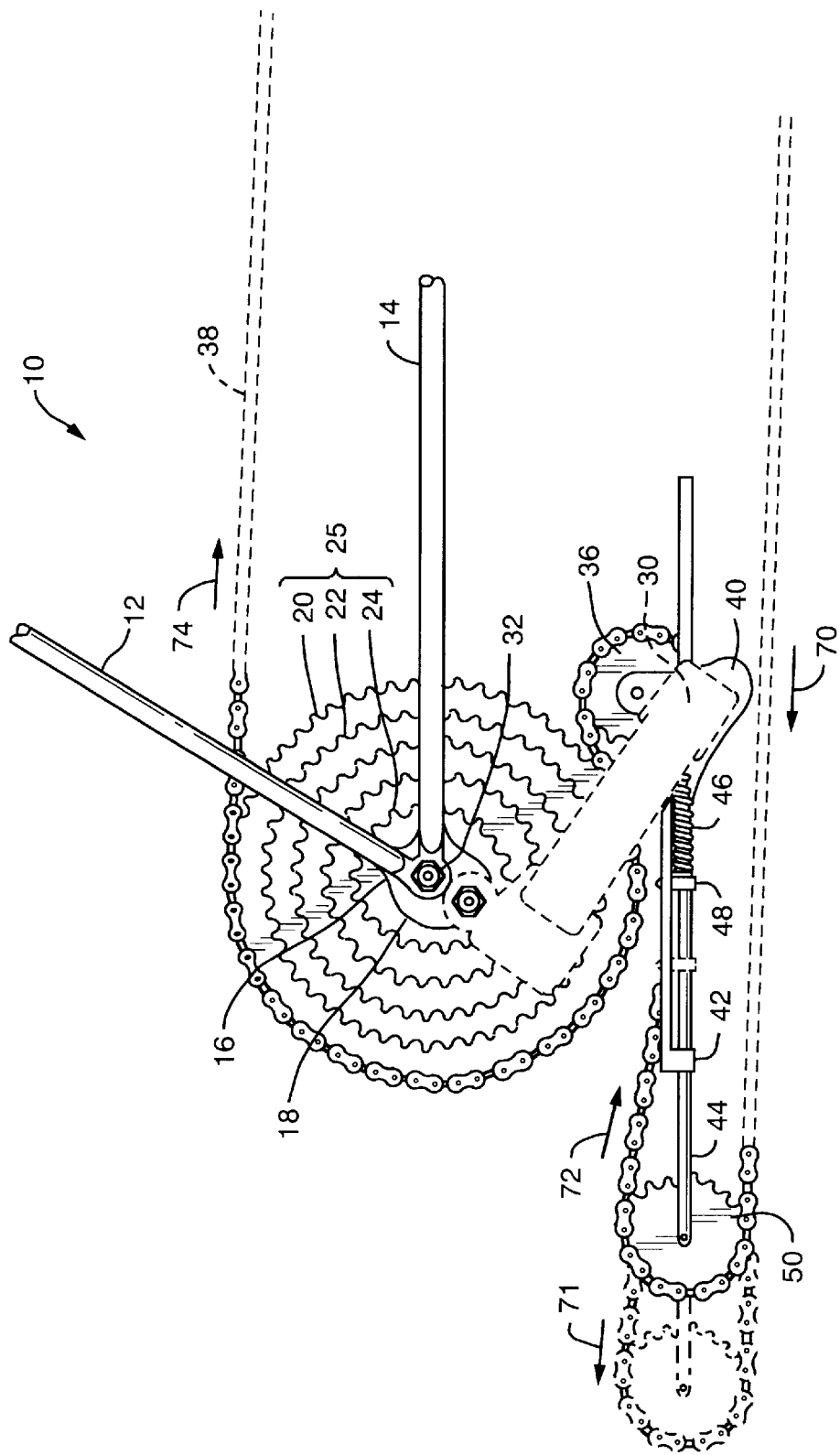
FIG. 1 is a view of the right side of the rear part of a bicycle showing a derailleur mechanism according to one embodiment of the invention.

Turning attention now to FIG. 1, a portion of a bicycle frame 10 used to support the rear wheel of the bicycle includes a tubular upper stay 12 and a tubular lower stay 14, both joined at a dropout plate 16. The upper stay 12, lower stay 14, and dropout plate 16 support the hub 18 of the rear wheel in a manner which is well known in the art. The rear wheel includes a number of main gear sprockets such as a large main sprocket 20, intermediate main sprockets 22, and smallest main sprocket 24.

A derailleur arm 30 is mounted to the bicycle typically at the dropout plate 16 secured by a bolt 32. The derailleur arm 30 supports a forward guide sprocket or pulley 36 such that the chain 38 may be cured or fixed to one of the main sprockets 20, 22, or 24 (collectively main sprockets 25) according to which of the gears has been selected by the bicyclist.

Rather than support the forward guide pulley 36 directly as in prior art arrangements, the derailleur arm 30 is connected to a support frame 40 arranged according to the present invention to support a rear take-up pulley 50 and to place a force upon it which urges it to move in a generally rearward or outboard direction from the hub 18.

In the particular embodiment shown in FIG. 1, the support frame 40 supports not only the forward guide pulley 36, but also a plunger guide 42, a plunger rod 44, a spring 46, and a spring collar 48. The rear take-up pulley 50 is disposed on the distal end of the plunger rod 44 opposite the forward guide pulley 36, i.e., towards the rear of the bicycle. The forward guide pulley 36 and rear take-up pulley 50 may or may not include teeth as shown. The plunger frame 40 generally supports the collar 42 and plunger rod 44 in a horizontal arrangement more or less in parallel with the lower tubular stay 14 of the bicycle frame 10.

Figure 2:
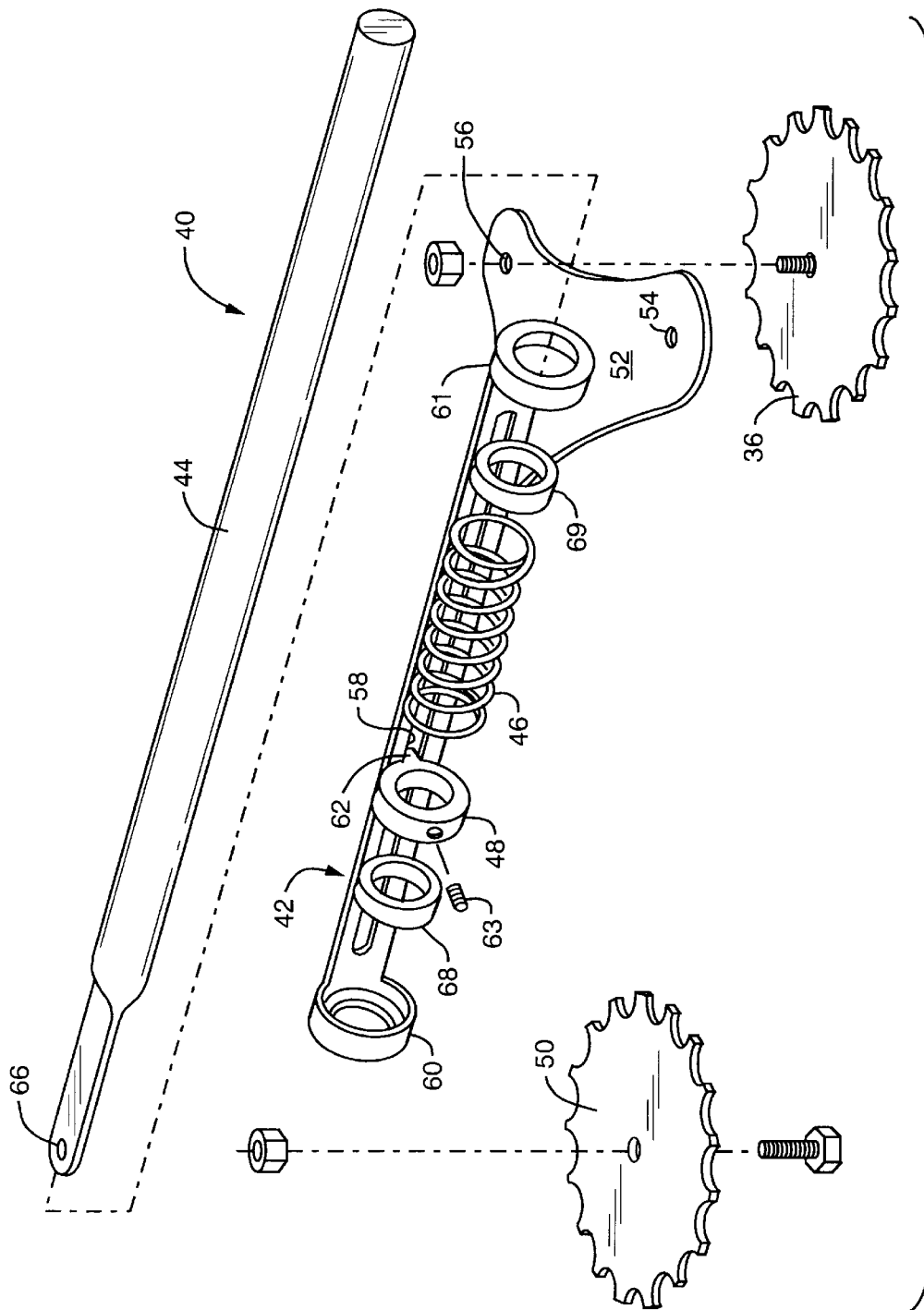
FIG. 2 is a exploded view of the components of the plunger-type derailleur.

The components of the bicycle derailleur mechanism of FIG. 1 are more particularly shown in the exploded view of FIG. 2. The plunger frame 40 is seen to include a generally elongated flange 52. The flange 52 provides support for not only the guide 42, but also for a derailleur arm mounting hole 54 and sprocket mounting and guide pulley mounting hole 56.

The guide 42 is seen to include a collar pin channel 58 as well as a pair of ring sections 60 and 61 mounted on the opposite ends thereof. The ring sections 60, 61 provide support and guidance for the plunger rod 44 as it moves back and forth in a manner described below. The channel 58 acts as a guide for the spring hold collar 48 which securely maintains the spring 46 about the plunger rod 44. The collar 48 includes a collar guide pin portion 62 on the upper end thereof to permit the plunger rod to be guided in more or less with the major axis of the guide 42, in a direction which is more or less in alignment with the forward to rearward axis of the bicycle frame 10. A set screw 63 is used to hold the spring collar 48 in place against the plunger frame 40. A mounting hole 66 in the distal end of the plunger rod 44 provides a mounting place for the rear take-up pulley 50. Nylon ring inserts 68, 69 are preferably disposed within the rings 60 and 61 respectively, in order to suitably frictionalize a surface for the plunger rod 44 to move freely back and forth between the rings 60, 61 without the frame 40.

Returning attention now to FIG. 1, a mode of operation of the derailleur mechanism according the present invention will be described in greater detail.

As the rider of the bicycle turns the pedals of the bicycle crank (not shown), the chain 38, moving generally in the direction of the arrow 70, approaches take-up pulley 50. In the example shown in FIG. 1 with the solid lines, the chain 38 wraps around the pulley 50 and travels in a "U" about its outer diameter. The chain then feeds over to the forward guide pulley 36 in the direction of arrow 72. The chain 38 continues around the forward guide pulley 36, again forming a U, and then continues in a generally rearward direction around one of the main sprockets 25 and then exits therefrom as indicated by the arrow 74. Eventually, the chain 38 continues forward towards the bicycle crank.

A control cable (also not shown in FIG. 1) is used to adjust the position of the derailleur arm 30 for laterally shifting the forward guide pulley 36 to align it with a different one of the main sprockets 25 in order to accomplish a gear change. When this occurs, the chain 38 is moved to a different one of the main sprockets 25 as selected by the bicyclist. In the example shown in the dashed lines, the bicyclist is now selecting the smallest main sprocket 24. With the chain now engaging a smaller sprocket, additional slack in the chain 38 needs to be taken up in order to maintain proper tension. In this instance, the tension bias provided by the spring loaded plunger rod 44 urges the rear take-up pulley 50 in an outward horizontal direction indicated by arrow 71 to the position indicated by the dashed lines. As a result, tension is maintained in the chain 38 as it is taken in or played out during the changing of gears.

As a result, the chain 38 runs between the rear take-up pulley 50 and forward guide pulley 36 as horizontally as possible, keeping the chain 38 as high above the ground as possible. This is accomplished without the use of supporting members as have been previously thought to be required to accomplish this desirable result.

The guide collar 42 assists the plunger frame 40 with holding the rear take-up pulley 50 in the outboard position with proper lateral alignment thereby prohibiting it from twisting and fouling the chain 38. The plunger frame 40 is thus not as susceptible to lateral movement as in prior devices.

The placement of the plunger frame 40 may be in the opposite position, i.e., with the channel 58 facing upward. However, by flipping the plunger frame in the manner shown, dust, dirt, and other elements are prevented from fouling the mechanism as in the case if the channel 58 were upward facing.

The derailleur mechanism of the present invention provides these functions by making use of an existing derailleur arm 30 on the bicycle frame 10, and merely requires installation of a new plunger frame 40 and feeding the chain through the new guide pulleys 36 and 50. The device is therefore easily installed with the simplest of tools.

Figure 3:
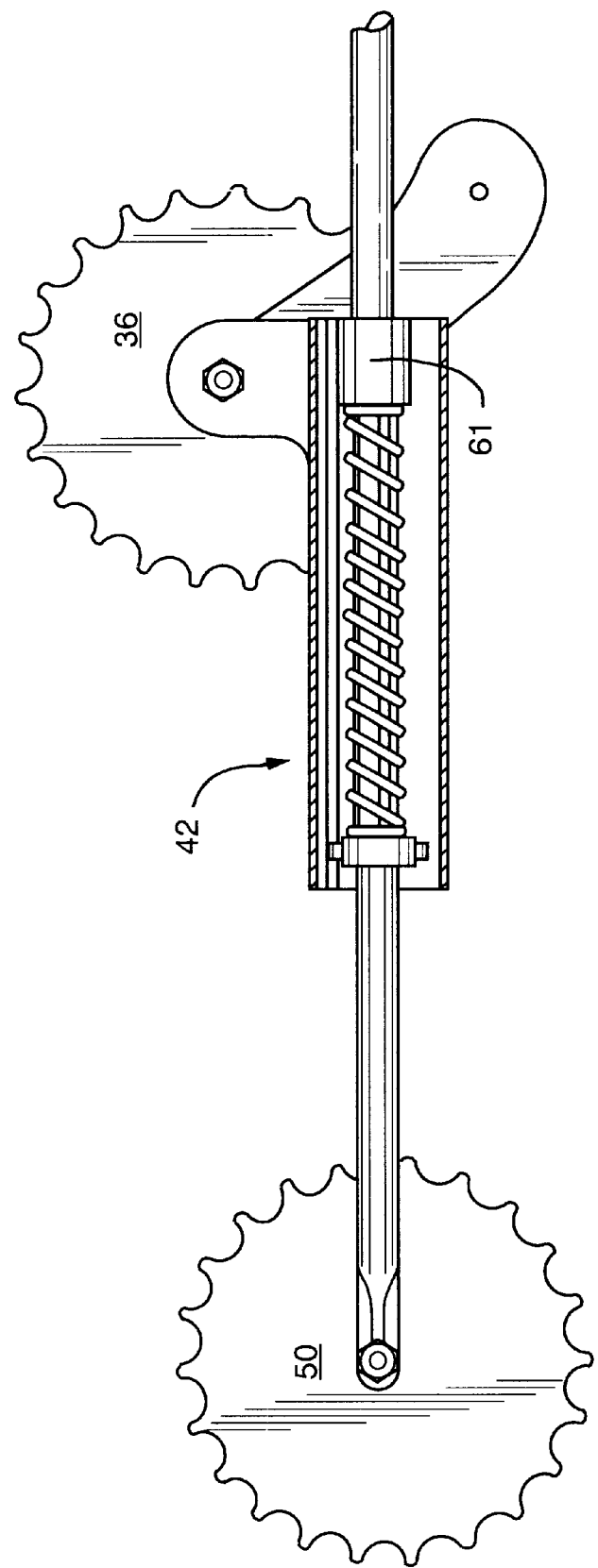
FIG. 3 is an alternate arrangement for the derailleur support.

There are other possible arrangements which accomplish the desired results. For example, the guide 42 may be shorter in length or even an enclosed tubular member or thicker single members 61 may be used as shown in FIG. 3.

Figure 4:
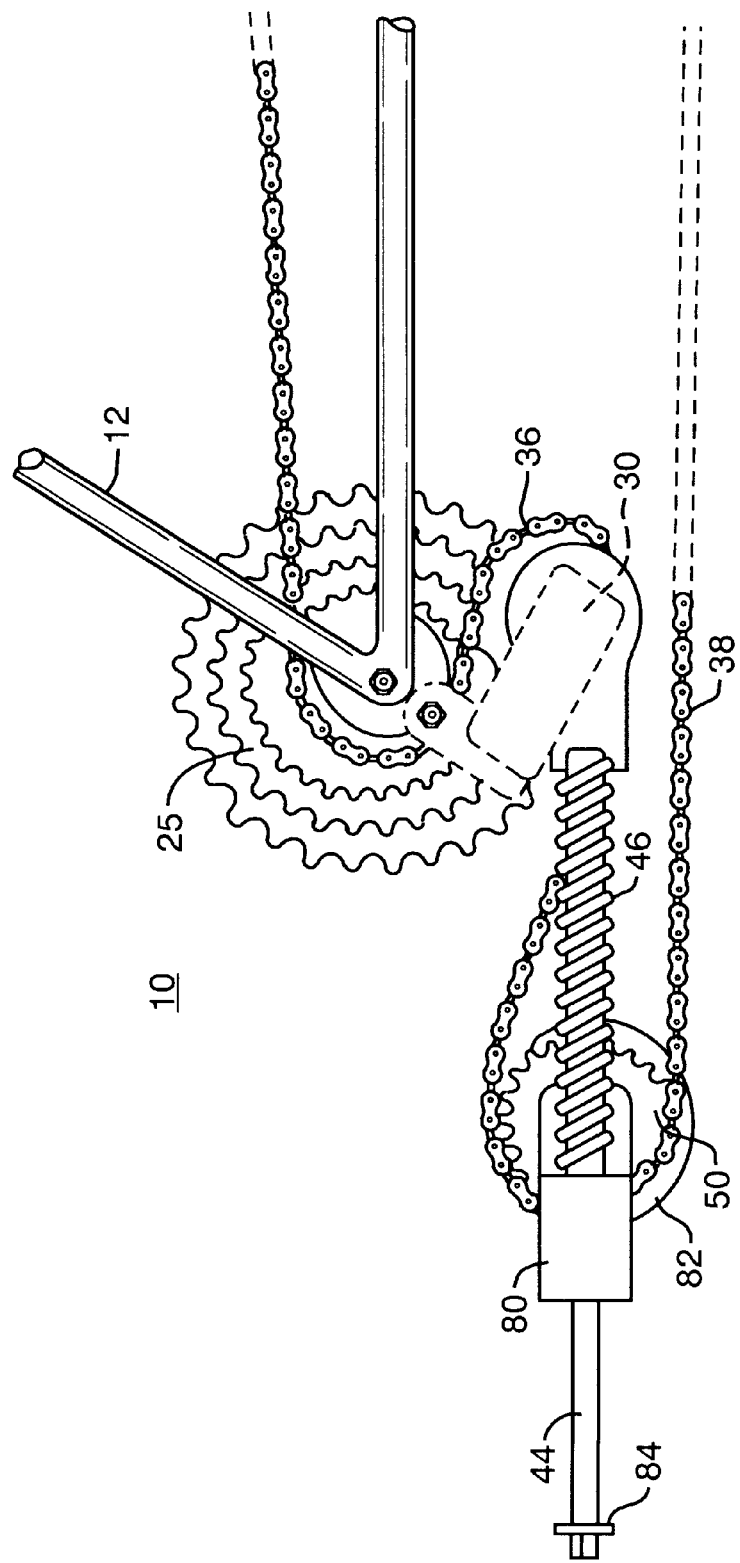
FIG. 4 is a view of the right side of a rear part of a bicycle showing an alternate embodiment of the derailleur using a slider block.

FIG. 4 is an alternative embodiment of the derailleur mechanism 10 according to the invention. As in the embodiment discussed in connection with FIG. 1, there is still the take-up pulley 50 that is urged in an outboard direction by a spring 46.

However, this embodiment has somewhat simpler construction through the use of a slider 80 adapted to move horizontally along the rod 44. The slider 80 serves not only to support the take-up pulley 50, but also as a bias point against which the spring 46 is placed.

In addition, a chain guard 82 may be disposed around the take-up pulley 50 in order to assist with proper alignment of the chain along the pulley 50. The chain guard 82 is placed on the outside of the rear take-up pulley 50 to further prevent the chain 38 from separating off the pulley once the unit is assembled to the bicycle.

A stopper 84 sets the outboard limit of movement of the slider 80. The stopper 84 may be provided by a threaded bolt placed in the end of the rod 44.

Thus, as in the embodiment described above in FIG. 1, adjust the position of the derailleur of 30 laterally shifts the forward guide pulley 36, and additional slack in the chain 38 is then taken up by the spring loaded rear take-up pulley 50. As a result, tension is maintained in the chain 38 as it is taken in or played out during the changing of gears.

As shown more particularly in FIG. 5, this particular embodiment may make use of a one piece rod 44 and support plate 40. As before, the support plate 40 is connected to the derailleur mechanism 30. As more evident from the figure, the slider block 80 has a hole 86 formed in the major portion 88 thereof. The hole 86 is adapted for placement of the rod 44 there through. The slider block 80 is formed of a material such as nylon which moves freely along the metal rod 44. A tab portion 89 of the slider 80 provides a surface to which to support the rear take-up pulley 50 and chain guard 82 via the nut and bolt assembly 91.

During assembly of this embodiment of the derailleur 10, the spring 46 is slid along the rod 44. The nylon slider block 80 is then slipped over the rod 44 and the stopper bolt 84 is applied. This provides a mechanism whereby the spring 46 urges the nylon slider block 80 and the attached rear take-up pulley 50 in a outboard direction.

Finally, as shown in FIG. 6, the rod may also be round in cross-section in which case the hole 86 in the slider 80 is also round.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or will be able to ascertain using no more than routine experimentation, many equivalents to the specific embodiments of the invention described specifically herein. Such equivalents are intended to be encompassed in the scope of the claims.

What is claimed is:

1. A bicycle frame having a rear wheel rotatably secured to said frame and the rear wheel having mounted thereon coaxially at least two spaced apart rear main sprockets for being driven by a roller chain the bicycle frame having a derailleur arm attached thereto for selecting from among the rear main sprockets for engagement by the roller chain, a roller chain support mechanism comprising a support frame secured to an end of the derailleur arm attached thereto, the support frame including resilient bias means for supporting a rear take-up guide pulley adapted for urging said roller chain in an outboard direction, wherein the resilient bias means additionally comprises:

a guide, supported on the support frame; and a plunger rod, adapted to be disposed within the guide, the plunger rod being resiliently biased against the guide, and the rear take-up pulley being mounted to an outboard end of the plunger rod.

2. An apparatus as in claim 1 wherein the support frame additionally includes a pair of spaced apart rings, and the plunger rod is supported by the rings.

3. An apparatus according to claim 1 wherein a guide collar is slidably mounted within a channel formed in the support frame to maintain spring tension as the derailleur arm is used to select one of the main sprockets.

4. An apparatus as in claim 1 wherein the support frame supports the plunger rod and rear take-up pulley in a substantially horizontal orientation with respect to the bicycle frame.

5. A bicycle frame having a rear wheel rotatable secured to said frame, and the rear wheel having mounted thereon coaxially at least two spaced apart rear main sprockets for being driven by a roller chain, the bicycle frame having a derailleur arm attached thereto for selecting from among the rear main sprockets for engagement by the roller chain, a roller chain support mechanism comprising a support frame secured to an end of the derailleur arm attached thereto, the support frame including resilient bias means for supporting a rear take-up guide pulley adapted for urging said roller chain in an outboard direction, wherein the resilient bias means additionally comprises:

a support rod, connected to the support frame, the support rod extending in a rearward direction from the derailleur arm mechanism;

a spring disposed about the support rod; and a slider block, disposed at the end of the support rod opposite the derailleur, the slider block also for supporting the rear take-up pulley.

6. An apparatus as in claim 5 wherein a chain guard is disposed adjacent the rear take-up pulley.

* * * * *